United States Patent [19]

Freitag

[11] 4,310,148

[45] Jan. 12, 1982

[54] CYLINDER-AND-PISTON DEVICE

[75] Inventor: Herbert Freitag, Koblenz-Metternich, Fed. Rep. of Germany

[73] Assignee: Stabilus GmbH, Koblenz-Neuendorf, Fed. Rep. of Germany

[21] Appl. No.: 94,073

[22] Filed: Nov. 14, 1979

[30] Foreign Application Priority Data

Nov. 18, 1978 [DE] Fed. Rep. of Germany ... 7834406[U]
Nov. 18, 1978 [DE] Fed. Rep. of Germany ... 7834364[U]

[51] Int. Cl.³ ............................................. B60G 11/26
[52] U.S. Cl. .................................. 267/124; 267/120; 267/64.25
[58] Field of Search ................. 267/129, 120, 113, 65, 267/64 R, 124; 188/275, 280, 285, 322

[56] References Cited

U.S. PATENT DOCUMENTS

| | | | |
|---|---|---|---|
| 3,207,498 | 9/1965 | Wustenhagen et al. | 267/65 R |
| 3,794,309 | 2/1974 | Chrokey et al. | 267/65 R |
| 3,937,450 | 2/1976 | Bauer | 267/113 |
| 3,963,225 | 6/1976 | Nicholls | 267/65 R |
| 3,963,227 | 6/1976 | Molders | 267/120 |
| 4,030,715 | 6/1977 | Duran | 267/64 R |
| 4,045,008 | 8/1977 | Bauer | 267/120 |
| 4,089,512 | 5/1978 | Allinquant et al. | 267/65 R |
| 4,113,071 | 9/1978 | Muller et al. | 267/64 R |

FOREIGN PATENT DOCUMENTS

| | | |
|---|---|---|
| 1857484 | 6/1962 | Fed. Rep. of Germany . |
| 758222 | 10/1956 | United Kingdom . |
| 816569 | 7/1959 | United Kingdom . |
| 862841 | 3/1961 | United Kingdom . |
| 1109355 | 4/1968 | United Kingdom . |
| 1188139 | 4/1970 | United Kingdom . |
| 1232894 | 5/1971 | United Kingdom . |
| 1465922 | 3/1977 | United Kingdom . |
| 1502971 | 3/1978 | United Kingdom . |

Primary Examiner—James B. Marbert
Attorney, Agent, or Firm—Brumbaugh, Graves, Donohue & Raymond

[57] ABSTRACT

In the illustrative embodiments of the invention described, a pneumatic cylinder-and-piston device includes a unitary piston structure for providing two different damping rates in dependency on the direction of movement of the piston within the cylinder. Fluid flow across the piston is preferably controlled, to effect the different damping rates, by use of an elastic sleeve which at one end is carried by the piston and which at the other end engages, suitably under fluid pressure, the inner surface of the cylinder.

20 Claims, 3 Drawing Figures

CYLINDER-AND-PISTON DEVICE

BACKGROUND OF THE INVENTION

1. Field of the Invention

The present invention relates to a pneumatic cylinder-and-piston device of the type in which the piston is differentially damped in dependency on its direction of movement within the cylinder, and pertains in particular to improved structure for accomplishing such damping in an efficient, yet simplified and low cost manner.

2. The Prior Art

Differentially damped pneumatic springs are well known, as represented, for example, by U.S. Pat. No. 3,207,498. In this known device, the piston is provided with a piston ring which is axially movable with respect to the piston member between two terminal positions in accordance with the direction of movement of the piston member relative to the cylinder member. In one terminal position, the piston ring functions to open one or more passages across the piston and, in the other terminal position, it functions to close the passage(s). The piston ring thus provides different piston damping rates as a function of the direction of movement of the piston. Although this damping control structure functions satisfactorily, it is relatively expensive from the viewpoints of manufacture and assembly.

SUMMARY

It is an object of the invention to provide damping control structure for a pneumatic cylinder-and-piston device which is comparatively simple in design and which can be manufactured and assembled at low cost.

The foregoing and other objects of the invention are attained, in accordance with the invention, by the provision, in a pneumatic cylinder-and-piston device, of damping flow control structure including an axially extending sleeve, one axial end of which is integral with the piston member and the other axial end of which is adjacent and exposed to one of the cylinder compartments. The free other end of the sleeve is preferably elastically deflectable in the radial direction and preferably is formed with a circumferentially and radially extending projection on the outer wall thereof at an axial location remote from the integral end in the direction of the free end of the sleeve, whereby the free end of the sleeve may be urged radially outwardly to establish sealing contact between the projection and the inner cylindrical face of the cylinder member when the pressure of fluid in the one compartment is increased, as, for instance, when the piston rod and piston move in the direction of that compartment. When the sleeve projection is not in sealing engagement with the cylinder wall, as, for instance, when the piston rod and piston move towards the other compartment, fluid may flow across the piston via the annular gap formed between the opposed walls of the sleeve and the cylinder, thereby reducing the damping effect on piston movement.

In a preferred embodiment, the sleeve is formed by an annular groove in the axial end wall of the piston bounding the one compartment. Secondary passages are also provided across the piston to allow for piston movement at a slower rate, i.e., increased damping, in the opposite direction. Advantageously, such secondary passages communicate with the annular groove which forms the sleeve.

As another feature of the invention, still another flow passage across the piston may be provided, either in combination with or in lieu of the flow passage around the sleeve periphery. According to this feature, the piston is provided with a central bore through which the inner end of the piston rod extends, the piston being axially movable along the piston rod to a limited extent between two terminal positions defined by abutment surfaces carried respectively by the piston and the piston rod. At one terminal position, the piston closes off the additional flow passage and at the other terminal position it opens the additional passage. Structure is provided on the piston, preferably in the form of the aforementioned sleeve, for frictionally engaging the inner cylindrical face of the cylinder member to move the piston between the two terminal positions in accordance with the direction of movement of the piston rod. Advantageously, the additional flow path is formed between the combined piston-and-sleeve member and the piston rod, whereby the abutment surfaces on the piston rod and piston acting to define the terminal positions of the piston may also readily function as the flow control surfaces for the additional passage.

BRIEF DESCRIPTION OF THE DRAWINGS

Further objects and advantages of the invention will be apparent from the following description of an exemplary embodiment thereof, taken in conjunction with the accompanying drawings, in which.

DETAILED DESCRIPTION

Figure 1:
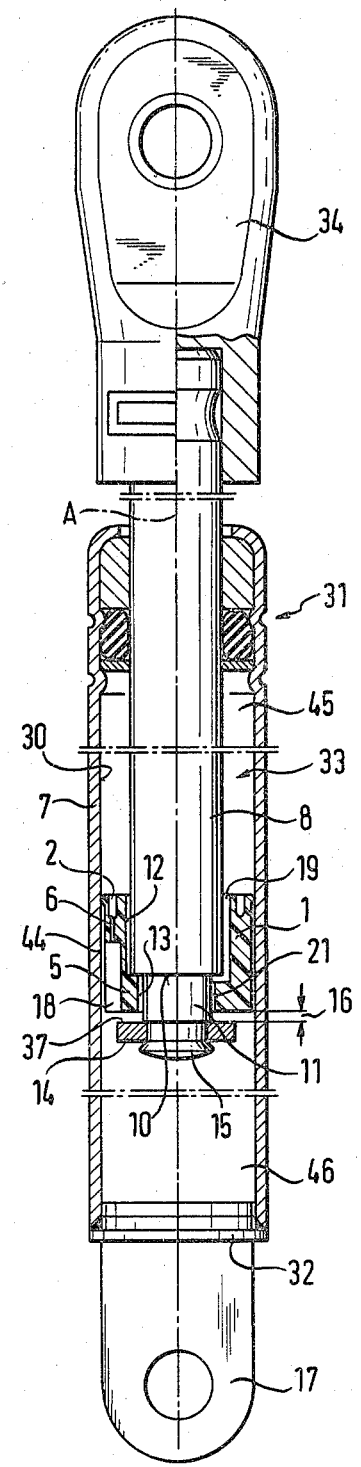
FIG. 1 is a longitudinal sectional view through a gas spring having a cylinder-piston arrangement in accordance with the invention.

In the embodiment of the invention shown in FIG. 1, a cylinder-and-piston device includes a cylinder member 7 having a longitudinal axis A and an inner cylindrical face 30. The cylinder 7 is provided at one end thereof with a guiding and sealing unit 31 and is closed at the other end by a bottom wall 32. A piston rod 8 extends through the guiding and sealing unit 31 into the cavity 33 defined within the cylinder member 7. The cavity 33 is filled with a suitable gas, e.g. nitrogen, under superatmospheric pressure. Fastening members 34 and 17 are provided on the outer end of the piston rod 8 and the bottom wall 32, respectively, for enabling installation of the device in the well known manner.

At its inner end, the piston rod 8 is formed with an axially extending member 11 of reduced diameter, thereby providing at the transition from the piston rod 8 to the extension member 11 an axially-directed shoulder face 10. Fixed, as, for example, by riveting at 15, to the lower end (as seen in FIG. 1) of the extension member 11 is an annular abutment member 14.

Figure 2:
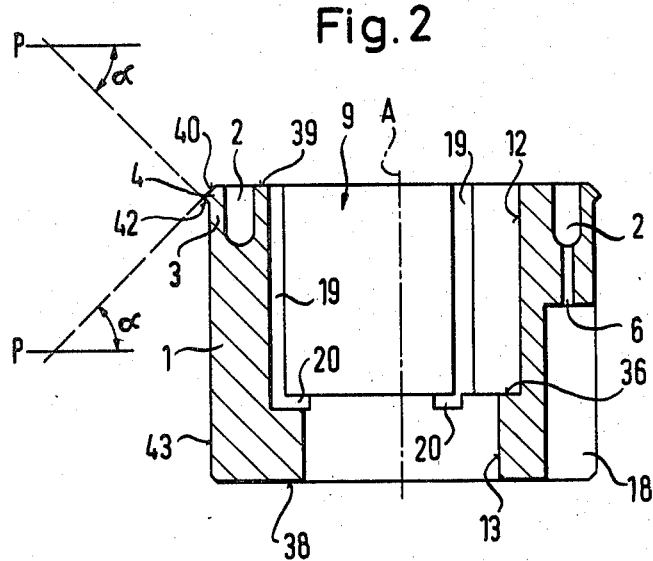
FIG. 2 is a longitudinal sectional view of the piston of the gas spring of FIG. 1.
Figure 3:
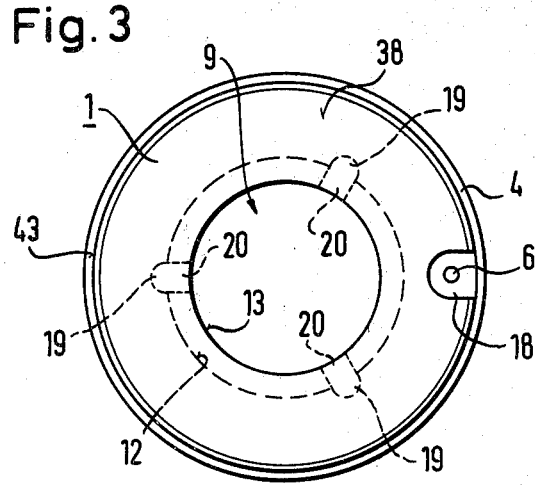
FIG. 3 shows a bottom end view of the piston of FIG. 2.

Captured between the shoulder face 10 and the abutment member 14, but capable of limited axial movement relative to the extension member 11, is a piston 1. The piston separates the cavity 33 into two compartments 45 and 46. As better seen in FIGS. 2 and 3, the piston 1 is provided with a central bore 9, which comprises a first section 12 of greater diameter and a second section 13 of smaller diameter. A shoulder face 36 is provided at the transition between the sections 12 and 13, which, as shown in FIG. 1, is directed towards shoulder face 10 on the piston rod 8. The upper surface of the abutment member 14 defines an abutment face 37, and a further abutment face 38 is defined by the lower end of piston member 1 (as seen in FIG. 2). When the piston 1 is assembled on the piston rod 8 (as shown in FIG. 1), the section 12 of the central bore 9 receives the lower end of the piston rod 8, whereas the second section 13 of the central bore 9 receives the extension member 11. As will be understood, the piston member 1 is axially movable with respect to the piston rod 8 between an upper terminal position (shown in FIG. 1), at which the shoulder face 10 and shoulder face 36 are in engagement, and a lower terminal position (not illustrated), at which the abutment face 38 of the piston member 1 and the abutment face 37 of the abutment member 14 are in engagement. The axial stroke of movement of the piston member 1 with respect to the piston rod 8 is illustrated by the distance 16 in FIG. 1.

As best seen in FIG. 2, an annular groove 2 is provided in the upper terminal face 39 of the piston member 1, thereby defining radially outwardly thereof a sleeve 3 which is integral at its lower end with the piston 1. The piston 1 is preferably made of elastic material, e.g. a plastic material such as nylon or polyethylene, so that the upper end of the sleeve 3 is radially deflectable with respect to the axis A. A circumferential, outward-directed projection 4 is provided at the upper end of sleeve 3. The annular projection 4 is defined by converging conical faces 40 and 42, which suitably are inclined at angles $\alpha$ within the range of from 20° to 45°, and preferably at approximately 30°, with respect to the planes P, which are perpendicular to the axis A.

As depicted in FIG. 2, the inner wall of the axial section 12 of the cylinder member 1 is formed with axial grooves 19. These axial grooves 19 are in communication with radially extending grooves 20 provided in the shoulder face 36. Referring now again to FIG. 1, it may be seen that the diameter of the section 13 of the central bore 9 is slightly larger than the extension member 11 so as to define an annular gap 21 between the section 13 and the member 11. The axial grooves 19, radial grooves 20, and annular gap 21 may therefore be seen to define a fluid passage extending across the piston and connecting the cylinder compartments 45 and 46.

The outer peripheral face 43 of the piston member 1 defines a narrow annular gap 44 with the inner cylindrical face 30 of the cylinder member (see FIG. 1), which gap, however, is closed off at the upper end (as shown in FIG. 1) by the engagement of the annular projection 4 with the inner cylindrical face 30 of the cylinder member 1. In addition, axial channels 18 are provided in the piston member 1 adjacent the outer peripheral face 43, and these channels are interconnected with the annular groove 2 via throttling bores 6. (See FIG. 2) The groove 2, throttling bores 6, and the channels 18 thus define another passage across the piston 1.

In operation, the pressurized gas in the cavity 33 biases the portion rod 8 outward of the cavity, i.e. in an upward direction as seen in FIG. 1, the biasing force being equal to the product of the pressure within the cavity 33 and the cross sectional area of the piston rod 8. When the piston rod 8 moves upward under such biasing force, the piston member 1 is moved to the lower terminal position with respect to the piston rod 8, i.e. the abutment faces 37 and 38 are in abutting engagement. This is due to frictional engagement of the annular projection 4 with the inner cylindrical face 30. During this outward movement of the piston rod, the pressure in the compartment 45 is somewhat higher than the pressure in the compartment 46. This pressure differential acts on the radial inner periphery of the sleeve 3 so as to urge the annular projection 4 into sealing engagement with the inner cylindrical face 30. The flow of gas around the projection 4 and through the gap 44 is thereby substantially interrupted. Further, the flow of gas through the central bore 9 is prevented due to the abutting and sealing engagement of the abutment faces 37 and 38, which closes off the annular gap 21. Gas flow from compartment 45 to compartment 46, therefore, is possible only through the secondary passage defined by the annular groove 2, the throttling bores 6, and the channels 18. As will be appreciated, this flow of gas is restricted by the throttling bores 6, so that the upward movement (as seen in FIG. 1) of the piston rod 8 under the action of the biasing force is damped.

When the piston rod 8 is moved inward of the cavity 33, i.e. downward as seen in FIG. 1, the piston 1 slides to the upper terminal position shown in FIG. 1. This position is maintained due to the friction of the annular projection 4 with the inner cylindrical face 30 and/or due to the pressure in compartment 46 acting on the lower side of the piston member 1 becoming greater than the pressure in compartment 45 acting on the upper side of the piston member 1. Consequently, the flow passage defined by axial grooves 19, radial grooves 20, and annular gap 21 is opened. This flow passage, being of larger cross sectional area, has a flow resistance that is considerably less than the flow resistance defined by the secondary passage 2, 6, 18. Moreover, when the piston rod 8 moves downward (as seen in FIG. 1) and the pressure in compartment 46 thereby becomes greater than the pressure in compartment 45, the annular projection 4 is no longer urged by fluid pressure against the inner cylindrical face 30 of the cylinder 7. Hence a passage across the piston 1 also exists through the gap 44 and around the radial outer edge of the radial projection 4. As a consequence, inward movement of the piston rod 8 by an external outer face is much less damped (or even substantially free of damping) than is the outward movement of the piston rod 8 under the biasing action of the pressurized gas.

As will be appreciated, therefore, there are two additional flow paths for the gas from compartment 46 to compartment 45 when the piston 1 moves downward, one via the axial grooves 19, radial grooves 20 and annular gap 21 and the other via the annular gap 44. Flow through the channels 18, bores 6 and groove 2 is of course also possible during downward movement of the piston rod. It is, however, possible to eliminate one of these additional two flow paths if a greater damping effect is desired in the inward direction. This may be done, for instance, by securing the piston 1 directly to the piston rod 8 and eliminating the axial grooves 19, the radial grooves 20 and the annular gap 21. In this case, during a downward movement of the piston rod 8 (as seen in FIG. 1) the gas, in addition to the restricted flow through bores 6, flows only through the gap 44 and around the outer edge of annular projection 4. If the one passage is eliminated in this way, then preferably the flow resistance through the gap 44 and around the radial outer edge of the annular projection 4 is made considerably smaller than the flow resistance through the throttling bores 6 in order to have a reduced damping effect when the piston rod 8 moves inward of the cavity 33 as compared to the damping effect when the piston rod 8 moves outward of the cavity 33.

As still a further variation of the embodiment of FIG. 1, it is also possible to eliminate the flow path through the gap 44 and around the annular projection 4 even though the piston member 1 is axially movable mounted on the piston rod 8 in the manner of FIG. 1 and even though the flow passage through the axial grooves 19, radial grooves 20 and annular gap 21 is retained. In this instance, the sleeve 3 and the annular projection 4 function only to control the position of the piston member 1 with respect to the piston rod 8, i.e. frictionally to engage the cylindrical surface 30 and cause the piston 1 to move axially between the two aforementioned terminal positions according to the direction of movement of the piston. It is further possible in this case to eliminate the sleeve 3 and the annular projection 4 entirely and simply to provide frictional engagement between the outer peripheral face 43 of the piston 1 and the inner cylindrical face 30 of the cylinder to control the axial movement of the piston 1 with respect to the piston rod 8 between the terminal positions. If desired, the flow path between the outer peripheral face 43 of the piston 1 and the inner cylindrical face 30 may in this instance be closed irrespective of the direction of movement of the piston rod 8, with damping then being controlled via the other two flow paths across the piston.

Although the invention has been described and illustrated herein by reference to specific embodiments thereof, it will be understood that various modifications and variations of such embodiments may be made without departing from the inventive concepts embodied therein. All such modifications and variations, therefore, are intended to be encompassed within the spirit and scope of the appended claims.

I claim:

1. In a pneumatic cylinder-and-piston device including a cylinder member having a longitudinal axis and two axial ends, the inner cylindrical face of said cylinder member and said axial ends defining a sealed cavity within said cylinder member; a piston rod member extending into said cavity through at least one of said axial ends for axial movement with respect to said cylinder member; a piston member mounted on said piston rod member inside said cavity for axial movement with said piston rod member, said piston member defining two compartments within said cavity; a fluid under superatmospheric pressure in said cavity; means defining at least one passage extending between said two compartments axially across said piston member; and means associated with said passage-defining means for opening and closing said at least one passage in dependency on the direction of movement of said piston member, the improvement comprising:

an axially extending sleeve carried by said piston member, said piston and sleeve defining a circumferential gap between the radially outer circumferential faces thereof and the inner cylindrical face of said cylinder member, a first axial end of said sleeve being integral with said piston member and the second axial end of said sleeve being adjacent to one of said compartments, at least said second end of said sleeve being elastically deflectable in the radial direction with respect to the longitudinal axis of the cylinder member, means defining a circumferential projection on the radially outer wall of said sleeve at an axial position remote from said first end of said sleeve in the direction of said second end of said sleeve, said circumferential gap communicating at one end with said other compartment and extending from said one end thereof in the direction of said one compartment to at least the location of said annular projection, said projection extending radially outward from said sleeve towards the inner cylindrical face of said cylinder member, said second end of said sleeve being ruged in the radially outward direction to establish sealing contact of said projection with said inner cylindrical face when the fluid pressure in said one compartment is increased above the fluid pressure in the other compartment.

2. The cylinder-and-piston device of claim 1, wherein said annular projection is located adjacent said second end of said sleeve.

3. The cylinder-and-piston device of claim 1, wherein the axial walls of said projection converge in the radially outward direction.

4. The cylinder-and-piston device of claim 3, wherein the axial walls of said projection are defined by two conical faces, each of said conical faces being inclined at an angle within the range of from 20° to 45° with respect to a plane perpendicular to the longitudinal axis of the cylinder member.

5. The cylinder-and-piston device of claim 1, wherein said sleeve is comprised of elastic material and elastically biases said projection into engagement with said inner cylindrical face irrespective of the pressure in said one compartment.

6. The cylinder-and-piston device of claim 1, wherein said seeeve is formed by an annular groove in a substantially axially directed face of said piston member facing said one compartment.

7. The cylinder-and-piston device of claim 1, wherein said piston member is made of plastic material.

8. The cylinder-and-piston device of claim 1, wherein said fluid comprises a body of gas.

9. The cylinder-and-piston device of claim 1, wherein said piston rod extends only through one end of said cylinder member, and said one compartment is that compartment including said one cylinder end.

10. In a pneumatic cylinder-and-piston device including a cylinder member having a longitudinal axis and two axial ends, the inner cylindrical face of said cylinder member and said axial ends defining a sealed cavity within said cylinder member; a piston rod member extending into said cavity through at least one of said axial ends for axial movement with respect to said cylinder member; a piston member mounted on said piston rod member inside said cavity for axial movement with said piston rod member, said piston member defining two compartments within said cavity; a fluid under superatmospheric pressure in said cavity; means defining at least one passage extending between said two compartments axially across said piston member; and means associated with said passage-defining means for opening and closing said at least one passage in dependency on the direction of movement of said piston member, the improvement comprising:

an axially extending sleeve carried by said piston member, a first axial end of said sleeve being integral with said piston member and the second axial end of said sleeve being adjacent to one of said compartments, at least said second end of said sleeve being elastically deflectable in the radial direction with respect to the longitudinal axis of the cylinder member, means defining a circumferential projection on the radially outer wall of said sleeve at an axial position remote from said first end of said sleeve in the direction of said second end of said sleeve, said projection extending radially outward from said sleeve towards the inner cylindrical face of said cylinder member, said second end of said sleeve being urged in the radially outward direction to establish sealing contact of said projection with said inner cylindrical face when the fluid pressure in said one compartment is increased above the fluid pressure in the other compartment, the improvement further comprising means defining a permanently open secondary passage across said piston member, means in said secondary passage for throttling fluid flow therethrough, the flow resistance of said throttling means being greater than the flow resistance of said at least one passage when said at least one passage is open.

11. The cylinder-and-piston device of claim 10, wherein said throttling means comprises one or more substantially axially-directed bores through said piston member.

12. The cylinder-and-piston device of claim 10, wherein said sleeve is formed by an annular groove in a substantially axially directed face of said piston member facing said one compartment, and said secondary passage communicates with said annular groove.

13. In a pneumatic cylinder-and-piston device including a cylinder member having a longitudinal axis and two axial ends, the inner cylindrical face of said cylinder member and said axial ends defining a sealed cavity within said cylinder member; a piston rod member extending into said cavity through at least one of said axial ends for axial movement with respect to said cylinder member; a piston member mounted on said piston rod member inside said cavity for axial movement with said piston rod member, said piston member defining two compartments within said cavity; a fluid under superatmospheric pressure in said cavity; means defining at least one passage extending between said two compartments axially across said piston member; and means associated with said passage-defining means for opening and closing said at least one passage in dependency on the direction of movement of said piston member, the improvement comprising:

an axially extending sleeve carried by said piston member, said piston member being provided with a central bore through which said piston rod extends, a first axial end of said sleeve being integral with said piston member and the second axial end of said sleeve being adjacent to one of said compartments, at least said second end of said sleeve being elastically deflectable in the radial direction with respect to the longitudinal axis of the cylinder member, means defining a circumferential projection on the radially outer wall of said sleeve at an axial position remote from said first end of said sleeve, said projection extending radially outward from said sleeve towards the inner cylindrical face of said cylinder member, said second end of said sleeve being urged in the radially outward direction to establish sealing contact of said projection with said inner cylindrical face when the fluid pressure in said one compartment is increased above the fluid pressure in the other compartment, wherein said piston member is axially movable with respect to said piston rod to a limited extent, said means for opening and closing said at least one passage including (1) abutment means on said piston rod and on said piston member for defining first and second terminal positions of said piston member with respect to said piston rod and (2) means on said piston rod and on said piston member for closing said at least one passage in one of said terminal positions and opening said at least one passage in the other of said terminal positions.

14. The cylinder-and-piston device of claim 13, wherein said opening-and-closing means on said piston member and on said piston rod member include a first substantially axially directed face on said piston rod and a second substantially axially directed face on said piston member, respectively, said first and second faces being in sealing engagement with one another when said piston member is in said one terminal position and axially spaced from one another when said piston member is in said other terminal position.

15. The cylinder-and-piston device of claim 13, wherein said piston rod includes a reduced-diameter portion extending axially from the inner end thereof, a first substantially axially directed shoulder face on the piston rod member being defined at the transition from said piston rod member to said reduced-diameter portion, said first shoulder face of the piston rod member comprising a part of said abutment means on said piston rod, said central bore of said piston member comprising a first axial section receiving the inner end of said piston rod member and a second axial section of reduced diameter receiving said reduced diameter portion, a second substantially axially directed shoulder face on said piston member being defined at the transition from said first axial section to said second axial section, said second shoulder face comprising a part of said abutment means on said piston member, said first and second abutment faces being in engagement when said piston member is in said one terminal position with respect to said piston rod member, said abutment means on said piston rod member further including an abutment member mounted on said extension member and carrying a third substantially axially-directed face, said abutment means on said piston member further including a fourth substantially axially directed face on said piston member, said third face engaging said fourth face when said piston member is in said other terminal position.

16. The cylinder-and-piston device of claim 15, wherein the improvement further comprises said at least one passage-defining means including one or more grooves in said piston member extending axially over said first section of said central bore, radially directed grooves in said shoulder face of said piston member communicating with said axial grooves, and an annular gap between said extension member and said second section of said central bore, said at least one passage being closed by engagement of said third and fourth faces when said piston is in said other terminal position.

17. In a pneumatic cylinder-and-piston device including a cylinder member having a longitudinal axis and two axial ends, the inner cylindrical face of said cylinder member and said axial ends defining a sealed cavity within said cylinder member; a piston rod member extending into said cavity through at least one of said axial ends for axial movement with respect to said cylinder member; a piston member mounted on said piston rod member inside said cavity for axial movement with said piston rod member, said piston member defining two compartments within said cavity; a fluid under superatmospheric pressure in said cavity; means defining at least one passage extending between said two compartments axially across said piston member; and means associated with said passage means for opening and closing said at least one passage in dependency on the direction of movement of said piston member, the improvement comprising:

means defining a central bore in said piston member, said piston rod extending through said central bore with said piston being axially movable thereon between first and second terminal positions; abutment means on said piston rod and on said piston member for defining said first and second terminal positions of said piston member; said opening-and-closing means for said at least one passage including means on said piston rod and on said piston member for closing said at least one passage in one of said terminal positions and opening said passage in the other of said terminal positions, said means on said piston member including means for frictionally engaging the inner cylindrical face of the cylinder member in at least one direction of movement of said piston rod relative to said cylinder.

18. The cylinder-and-piston device of claim 17, wherein said frictionally-engaging means is responsive to an increase in the pressure in one of said compartments to frictionally engage said inner cylindrical surface.

19. The cylinder-and-piston device of claim 17, wherein said frictionally-engaging means tightly engages said inner cylindrical face in both directions of movement of said piston rod.

20. The cylinder-and-piston device of claim 17, wherein said frictionally engaging means comprises a substantially axially extending sleeve having a first axial end thereof integral with said piston member and a second axial end thereof adjacent to one of said compartments, said second end of said sleeve being elastically deflectable in the radial direction with respect to the longitudinal axis of the cylinder member, and means defining a circumferential projection on the radially outer wall of said sleeve in an axial position remote from said first end in the direction of said second end of said sleeve, said annular projection extending radially outward from said sleeve towards said inner cylindrical face of said cylinder member, said second end of said sleeve being urged in the radially outward direction to establish sealing contact of said projection with said inner cylindrical face of said cylinder member when the fluid pressure in said one compartment is increased above the fluid pressure in the other compartment.

* * * * *